(12) United States Patent
Fujita et al.

(10) Patent No.: US 8,083,019 B2
(45) Date of Patent: Dec. 27, 2011

(54) UPPER ASSEMBLY STRUCTURE OF WORK MACHINE

(75) Inventors: Yuji Fujita, Osaka (JP); Shinya Mukae, Takaishi (JP); Junichi Fujiwara, Osaka (JP)

(73) Assignee: Kubota Corporation, Osaka (JP)

( * ) Notice: Subject to any disclaimer, the term of this patent is extended or adjusted under 35 U.S.C. 154(b) by 286 days.

(21) Appl. No.: 12/398,414

(22) Filed: Mar. 5, 2009

(65) Prior Publication Data
US 2009/0242311 A1 Oct. 1, 2009

(30) Foreign Application Priority Data
Mar. 31, 2008 (JP) .................. 2008-090094

(51) Int. Cl.
*B60K 5/00* (2006.01)
(52) U.S. Cl. ...................... 180/291; 180/69.2; 180/89.17
(58) Field of Classification Search .................. 180/291, 180/69.2, 89.17, 312; 280/781
See application file for complete search history.

(56) References Cited

U.S. PATENT DOCUMENTS

| | | | |
|---|---|---|---|
| 7,188,865 B2 * | 3/2007 | Sugiyama et al. | 280/759 |
| 7,204,047 B2 * | 4/2007 | Murakami | 37/347 |
| 7,523,804 B2 * | 4/2009 | Tanaka et al. | 180/291 |
| 7,717,218 B2 * | 5/2010 | Matsumoto et al. | 180/291 |
| 2004/0188166 A1 * | 9/2004 | Sugiyama et al. | 180/291 |
| 2005/0210717 A1 * | 9/2005 | Ueda et al. | 37/443 |
| 2006/0108309 A1 | 5/2006 | Sato et al. | |
| 2010/0122862 A1 * | 5/2010 | Fujiwara et al. | 180/69.2 |
| 2010/0236855 A1 * | 9/2010 | Matsushita et al. | 180/69.2 |

FOREIGN PATENT DOCUMENTS

| | | | |
|---|---|---|---|
| JP | 09316929 A | * | 12/1997 |
| JP | 2003064724 A | | 3/2003 |

* cited by examiner

*Primary Examiner* — Drew Brown
(74) *Attorney, Agent, or Firm* — The Webb Law Firm

(57) ABSTRACT

An upper assembly structure of a work machine comprising a driver's seat mounted on a vehicle body, an engine compartment for housing an engine, a tank compartment for housing a tank, a hood, a tank cover member, a first partition for partitioning between the engine compartment and the driver's seat, a second partition for partitioning between the tank compartment and the driver's seat, and a support frame mounted on the engine compartment including an arm member protruding from the support frame toward the tank compartment, wherein the engine compartment and the tank compartment are arranged to form an L-shape as viewed from the top, wherein the engine compartment is covered by the first partition and the hood, wherein the tank compartment is covered by the second compartment and the tank cover member, and wherein the arm member supports internal equipment arranged inside the tank compartment.

5 Claims, 11 Drawing Sheets

UPPER ASSEMBLY STRUCTURE OF WORK MACHINE

TECHNICAL FIELD

The present invention relates to an upper assembly structure of a work machine such as a backhoe used in construction work or public engineering work.

BACKGROUND ART

In this type of the conventional machine, the upper assembly structure comprises a swivel deck body mounted on a propelling apparatus to swivel about a vertical axis, an engine mounted rearwardly of the swivel deck body, an oil tank and a fuel tank arranged at the right side of the swivel deck body, the engine and the tanks being covered at peripheries thereof, a driver's seat mounted at a side of the tank forwardly and upwardly of the engine, a rear cover member for covering an engine compartment housing the engine, a cover member for covering a tank compartment housing the oil tank, and a support frame mounted at a rear portion of the swivel deck body to extend across the engine for supporting the cover members and a protection device such as a cabin or a ROPS covering the driver's seat (see Japanese Unexamined Patent Application Publication No. 2003-64724).

The support frame includes a backbone member provided above the engine, a pair of right and left front leg members and a pair of right and left rear leg members extending downward from the backbone member at front and rear portions thereof to support the rear cover member and the protection device.

SUMMARY OF THE INVENTION

Problem to be Solved by the Invention

In the conventional machine as noted above, the support frame only supports the rear cover and the protection device positioned, rearwardly of the swivel deck, but does not support any member mounted forwardly thereof. The oil tank is supported by the swivel deck at a lower portion thereof, but not at an upper portion thereof, which requires more rigid support.

The object of the present invention is to provide an upper assembly structure of a work machine for solving the problem inherent in the conventional machine.

Such an upper assembly structure of the work vehicle is achieved by an arm member extending from the support frame for rigidly supporting not only partitions or a hood but also internal equipment accommodated in the tank compartment and providing accurate relative positional relationships between those components.

Means for Solving the Problem

A characteristic feature of the present invention lies in the upper assembly structure of the work machine comprising, a driver's seat mounted on a vehicle body, an engine compartment for housing an engine, a tank compartment for housing a tank, a hood, a tank cover member, a first partition for partitioning between the engine compartment and the driver's seat, a second partition for partitioning between the tank compartment and the driver's seat, and a support frame mounted on the engine compartment including an arm member protruding from the support frame toward the tank compartment, wherein the engine compartment and the tank compartment are arranged to form an L-shape as viewed from the top, wherein the engine compartment is covered by the first partition and the hood, wherein the tank compartment is covered by the second partition and the tank cover member, and wherein the arm member supports internal equipment arranged inside the tank compartment.

Another characteristic feature of the present invention lies in the upper assembly structure of the work machine comprising a driver's seat mounted on a vehicle body, an engine compartment provided in a rear portion of the vehicle body for housing an engine, a tank compartment provided in one lateral side of the vehicle body for housing a oil tank, a first partition for partitioning the assembly at a front side of the engine compartment, a hood for covering a rear portion of the engine compartment to be opened and closed, a side partition for covering a side of the tank compartment adjacent to the driver's seat, a tank cover member for covering an outward portion of the tank compartment to be opened and closed, a second partition for partitioning between the tank compartment and the driver's seat, and a support frame mounted on the engine compartment including a backbone member positioned above the engine, a left front leg member, a right front leg member, a rear leg member, the left front leg member, the right front leg member, and the rear leg member being extending downward forwardly and rearwardly of the backbone member, and an arm member extending forward from an end of the backbone member adjacent to the tank compartment, wherein the support frame is adapted to support the first partition, the hood, and the second partition at a rear portion thereof, and wherein the arm member is adapted to support the tank cover member and the oil tank.

In the above-noted construction, it is preferable that the oil tank is arranged at the right side of the vehicle body, that the arm member of the support frame extends forward from a right end of the backbone member, and that the front leg member is connected to a fore-and-aft intermediate portion of the arm member at an upper portion thereof.

In the above-noted construction, it is preferable that a pivotal support member is attached to a left end of the backbone member at an upper portion thereof for supporting a left end of the hood to be pivotable about a vertical axis, and that a cover receiving member is attached to the rear leg member for closing a right end of the hood as closed and a rear edge of the tank cover member.

The upper assembly structure of the work machine noted above achieves the following functions and effects.

Since the support frame including the backbone member and the pair of right and left front leg members and the pair of right and left rear leg members further includes the arm member extending toward the tank compartment, the arm member is capable of receiving the tank (oil tank, internal equipment) thereby to enhance the attachment strength for the tank. Further, the front-and-rear partition, the side partition, and the hood can be supported to the support frame, and also the relative positioning of those components can be accurate.

Since the upper portion of the right front leg member is connected to the fore-and-aft intermediate portion of the arm member extending forward from the backbone member, the supporting strength for the arm member is enhanced, as a result of which the supporting strength for the tank and the tank cover member attached to the arm member is also enhanced.

Since the hood and the tank cover member are attached to the support frame, the positional relationship of those components call be accurate. Further, the right end of the hood that is pivotably supported at the left end thereof and the rear edge of the tank cover member are sealed reliably by providing the cover receiving member for bringing the right end of the hood as closed into contact the rear edge of the tank cover member.

According to the present invention, not only the partitions or the hood but also the internal equipment accommodated in the tank compartment can be rigidly supported and accurate relative positional relationships between those components are maintained.

DETAILED DESCRIPTION OF THE PREFERRED EMBODIMENTS

An embodiment of the present invention will be described hereinafter in reference to the accompanying drawings.

Figure 10:
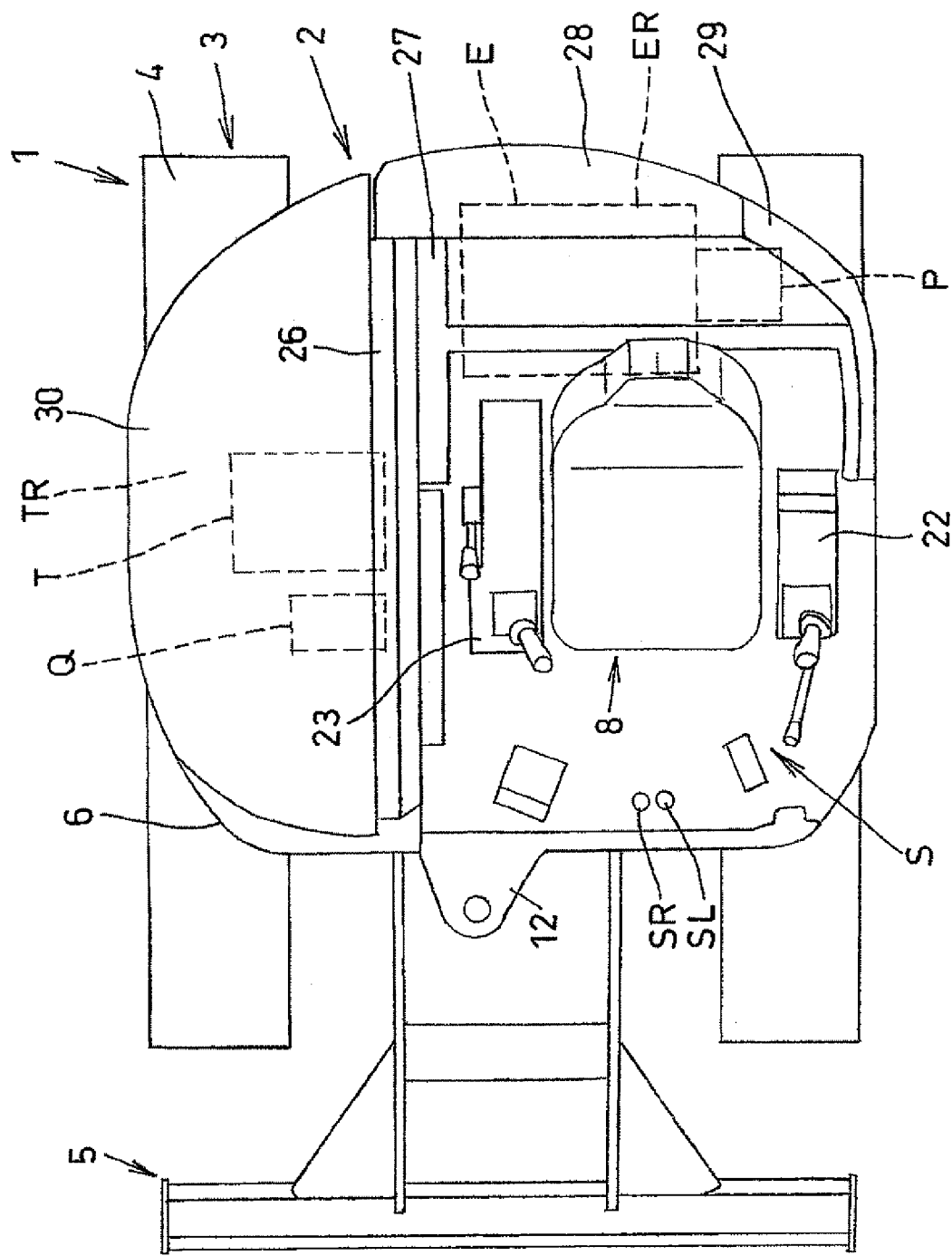
FIG. 10 is a schematic top plan view of a backhoe.
Figure 11:
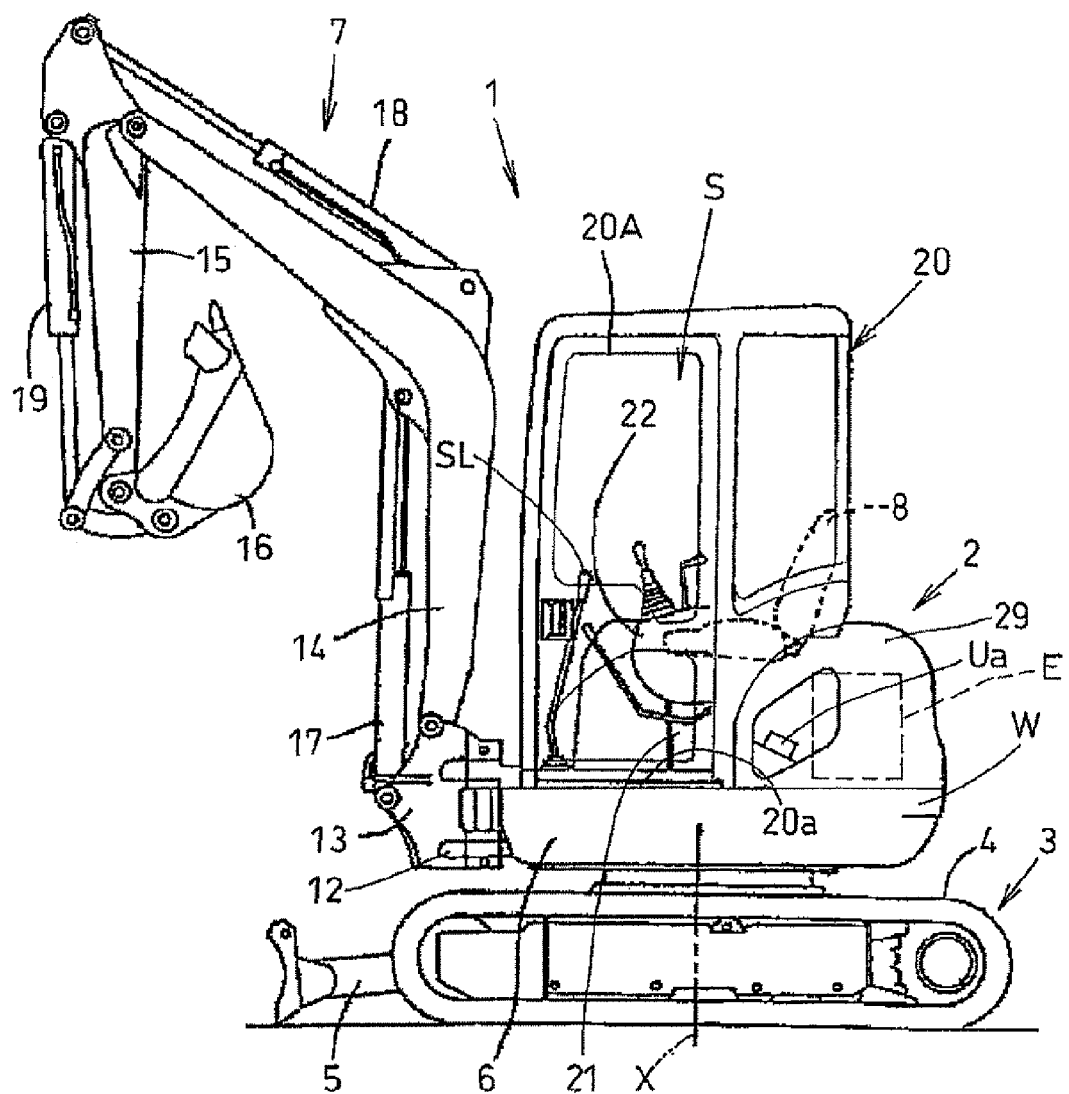
FIG. 11 is an elevation side view of the backhoe.

In FIGS. 10 and 11, numeral 1 denotes a backhoe exemplifying a work machine (swivel work machine). The backhoe I comprises an upper swivel body (upper assembly structure) 2, a propelling apparatus 3 provided downwardly of the swivel body 2, a dozer apparatus 5 acting as an work implement attached to a front portion of the propelling apparatus 3, and an excavating apparatus 7 acting as a work implement attached to the front portion of the swivel body 2.

The propelling apparatus 3 includes crawler devices 4 mounted on lateral opposite sides thereof. Each crawler device 4 has an idler wheel mounted at one side thereof in a fore and aft direction, and a driving wheel mounted at the other side thereof and a crawler belt wound around a plurality of rollers provided between the idler wheel and the driving wheel. The driving wheel of each crawler device 4 is driven by a hydraulically operated propelling motor.

The dozer apparatus 5 is attached to the front portion of the propelling apparatus 3 to be vertically pivotable by a dozer cylinder including a hydraulic cylinder.

In FIGS. 1 to 11, the swivel body 2 is supported on the propelling apparatus 3 to swivel about a vertical axis X. The swivel body 2 includes a swivel deck 6 (vehicle body) 6 to swivel sideways by a hydraulically operated swivel motor. A driver's seat 8 is mounted on the swivel body 2 at a substantially mid portion thereof in the fore-and-aft direction, and an engine compartment ER is provided in a rear portion of the swivel deck 6. An engine E, a hydraulic pump P, a radiator L, an oil cooler M, and an air cleaner N are accommodated in the engine compartment ER. A front-and-rear partition 27 is provided between the engine compartment ER and the driver's seat 8.

A tank compartment TR is provided in one lateral side (right side) of the swivel deck 6 for accommodating an oil tank (tank) T, a control valve Q, batteries and the like. A side partition 26 is provided between the tank compartment TR and the driver's seat 8. The control valve Q is attached to a front surface of the oil tank T.

The excavating apparatus 7 is attached to the front portion of the swivel deck 6. A counter weight W is mounted, in addition to the engine E, on a rear portion of the swivel deck 6 in order to strike a weight balance between the swivel deck 6 and the excavating apparatus 7.

The excavating apparatus 7 includes a support bracket 12 and a pivotable bracket 13. The support bracket 12 is fixed to the front portion of the swivel deck 6 while the pivotable bracket 13 is supported to the support bracket 12 to be pivotable sideways about a vertical axis. The pivotable bracket 13 swings sideways by a hydraulically operated cylinder The excavating apparatus 7 includes a boom 14 supported to the pivotable bracket 13 to be vertically pivotable, an arm 15 pivotably supported at a proximal end thereof to a distal end of the boom 14, and a bucket 16 attached to a distal end of the arm 15 for scooping and dumping operations. The boom, the arm, and the bucket are activated by a boom cylinder 17, an arm cylinder 18, and a bucket cylinder 19, respectively. The boom cylinder 17, the arm cylinder 18, and the bucket cylinder 19 are constituted by hydraulic cylinders, for example.

An operator's section S mounted on the swivel deck 6 is partitioned by the partitions, that is, the front-and-rear partition 27 and the side partition 26. The driver's seat 8 is arranged forward of the front-and-rear partition 27 and leftward of the side partition 26. A pair of right and left propelling control levers SR and SL are arranged forward of the driver's seat 8 for controlling the right and left crawler devices 4, separately or simultaneously. Pedals are provided around the operator's right and left feet.

Figure 9:
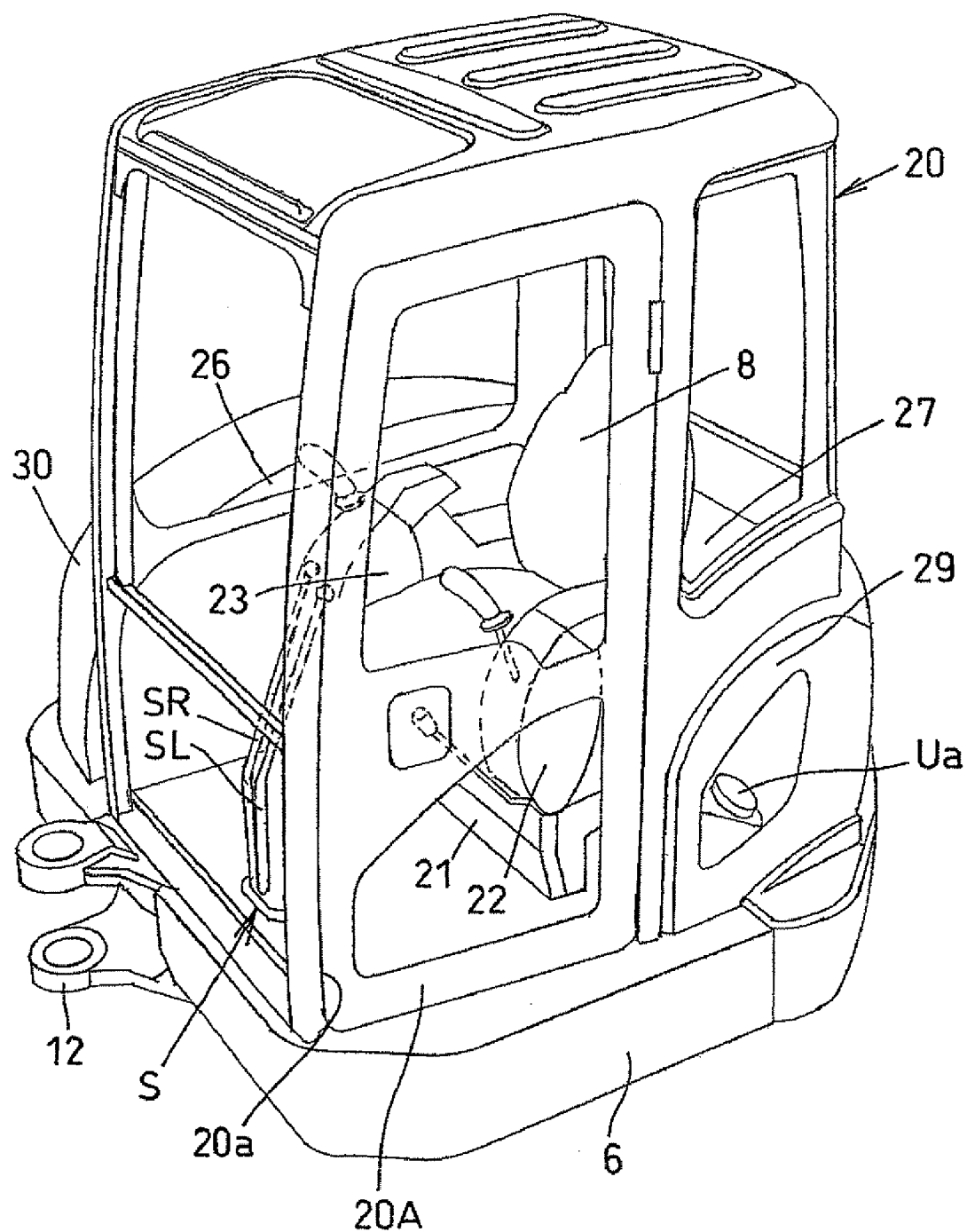
FIG. 9 is a perspective view of the upper assembly structure including a cabin.

As shown in FIG. 9, a cabin 20 surrounding the operator's section S is mounted on the swivel deck 6.

The cabin 20 is defined by the front-and-rear partition 27 at a lower rear portion thereof. Although a right wall of the cabin 20 is present, the side partition 26 may also be used as the right wall of the cabin. An opening and closing door 20A is provided at an entrance 20a of the cabin 20.

Instead of the cabin 20, a two-column type ROPS or a four-column type canopy (acting as a protection device with a sunshade for a driver's seat) may be employed.

A pair of vertical side walls 6B extending to widen rearward from the support brackets 12 and an intermediate wall 6C partitioning the swivel deck into a front part and a rear part are provided upright on a top surface of a pedestal 6A acting as a bottom of the swivel deck 6. The engine E is mounted rearwardly of the intermediate wall 6C through a mounting attachment.

The engine compartment ER accommodating the engine E, the hydraulic pump P, the air cleaner N and the like is partitioned at a front side thereof by the front-and-rear partition 27 extending upright from the intermediate wall 6C, and is covered by a hood 28 at a rear side and by a left cover member 29 at a left side thereof, for example.

Figure 1:
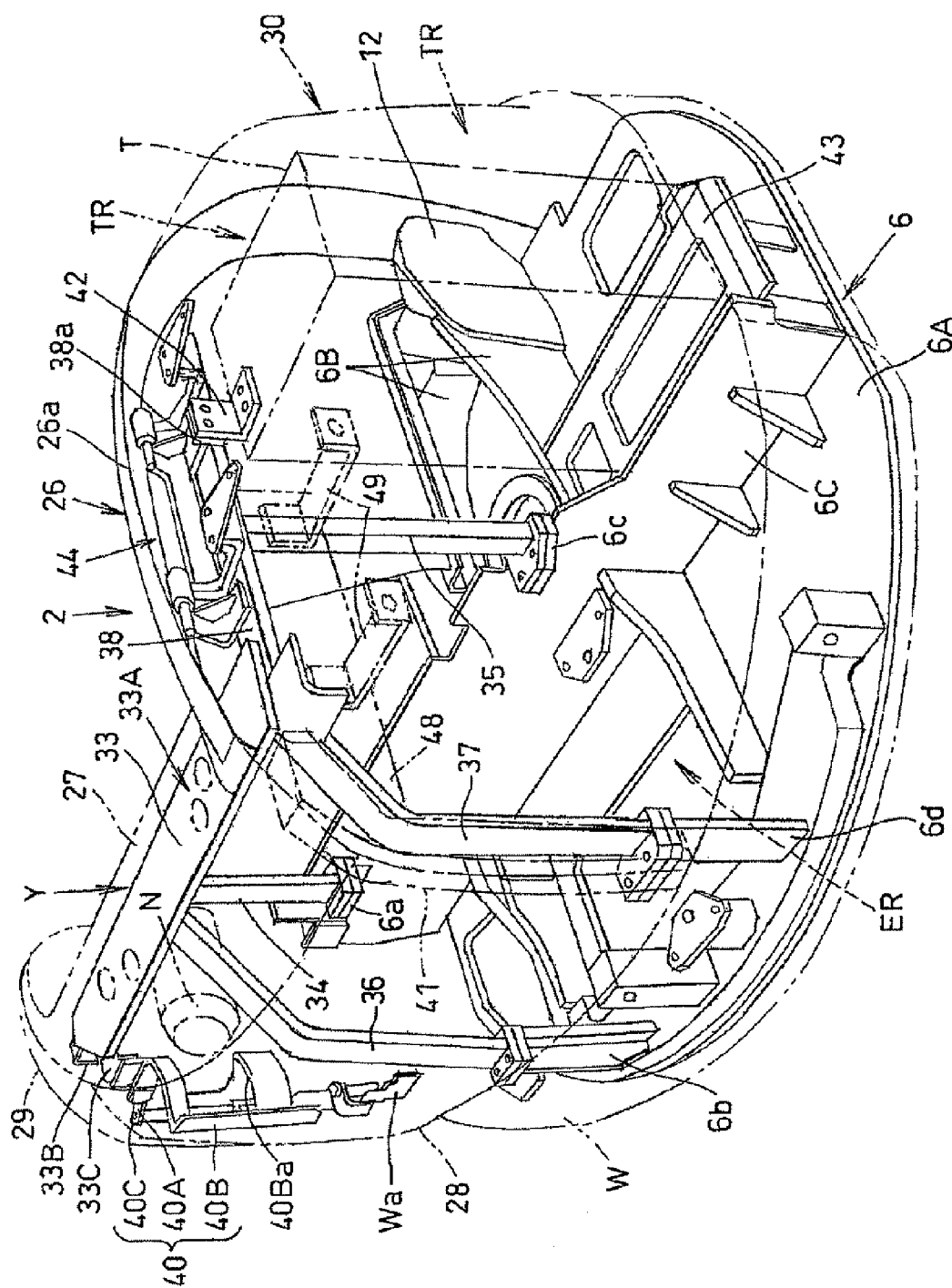
FIG. 1 is an explanatory perspective view of a primary portion showing an embodiment of the present invention.
Figure 2:
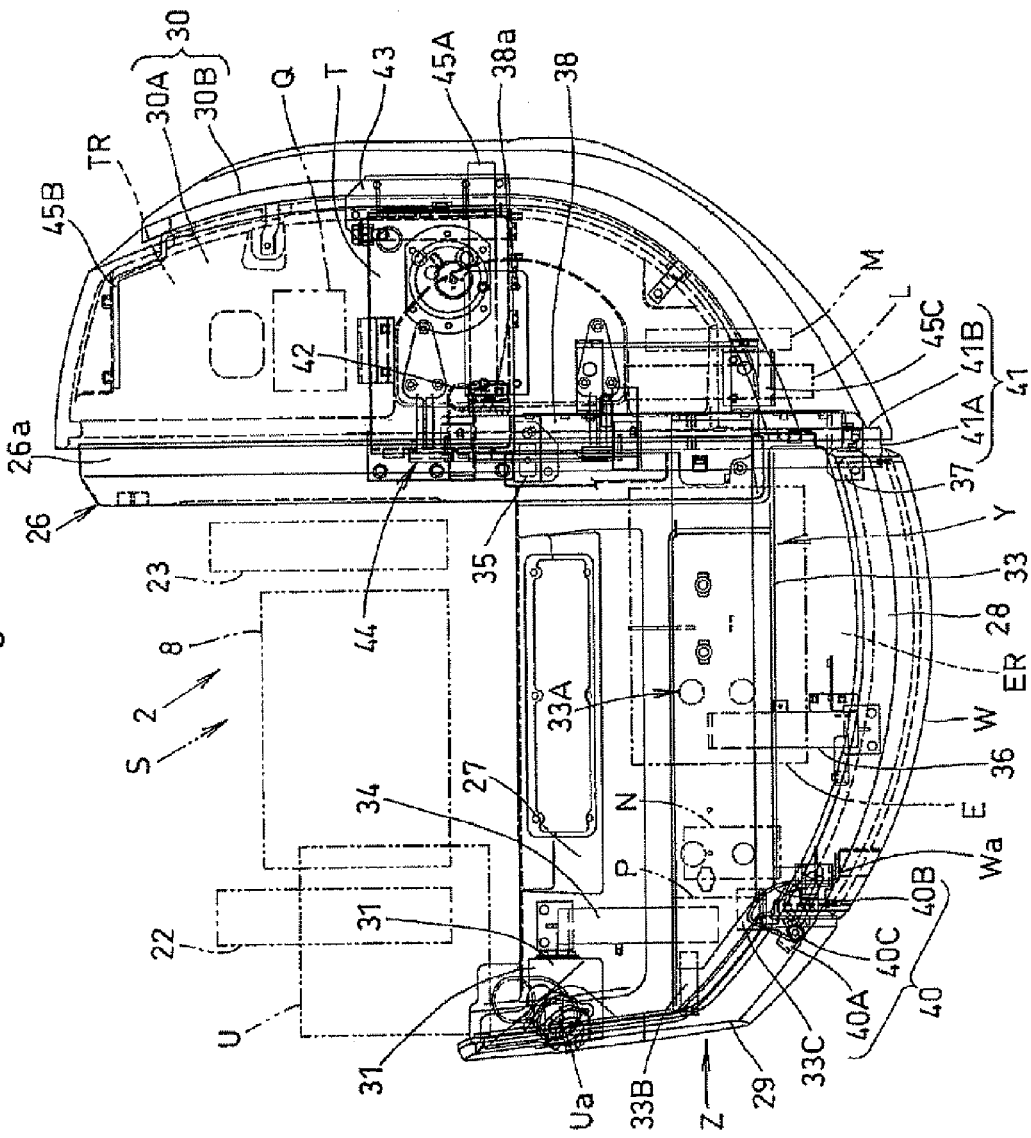
FIG. 2 is a top plan view of an upper assembly structure of a swivel deck.
Figure 3:
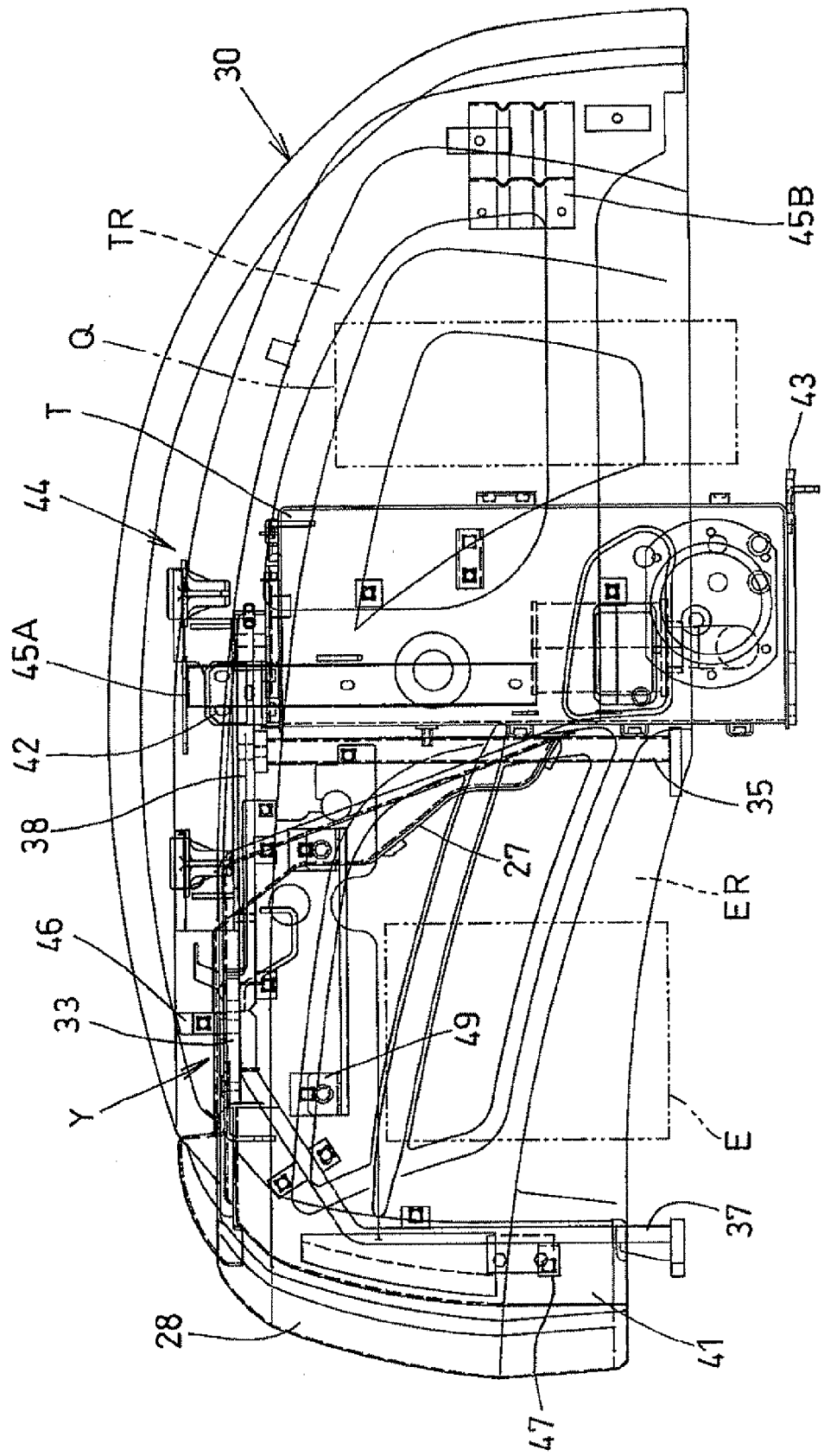
FIG. 3 is a right side view of the upper assembly structure.
Figure 4:
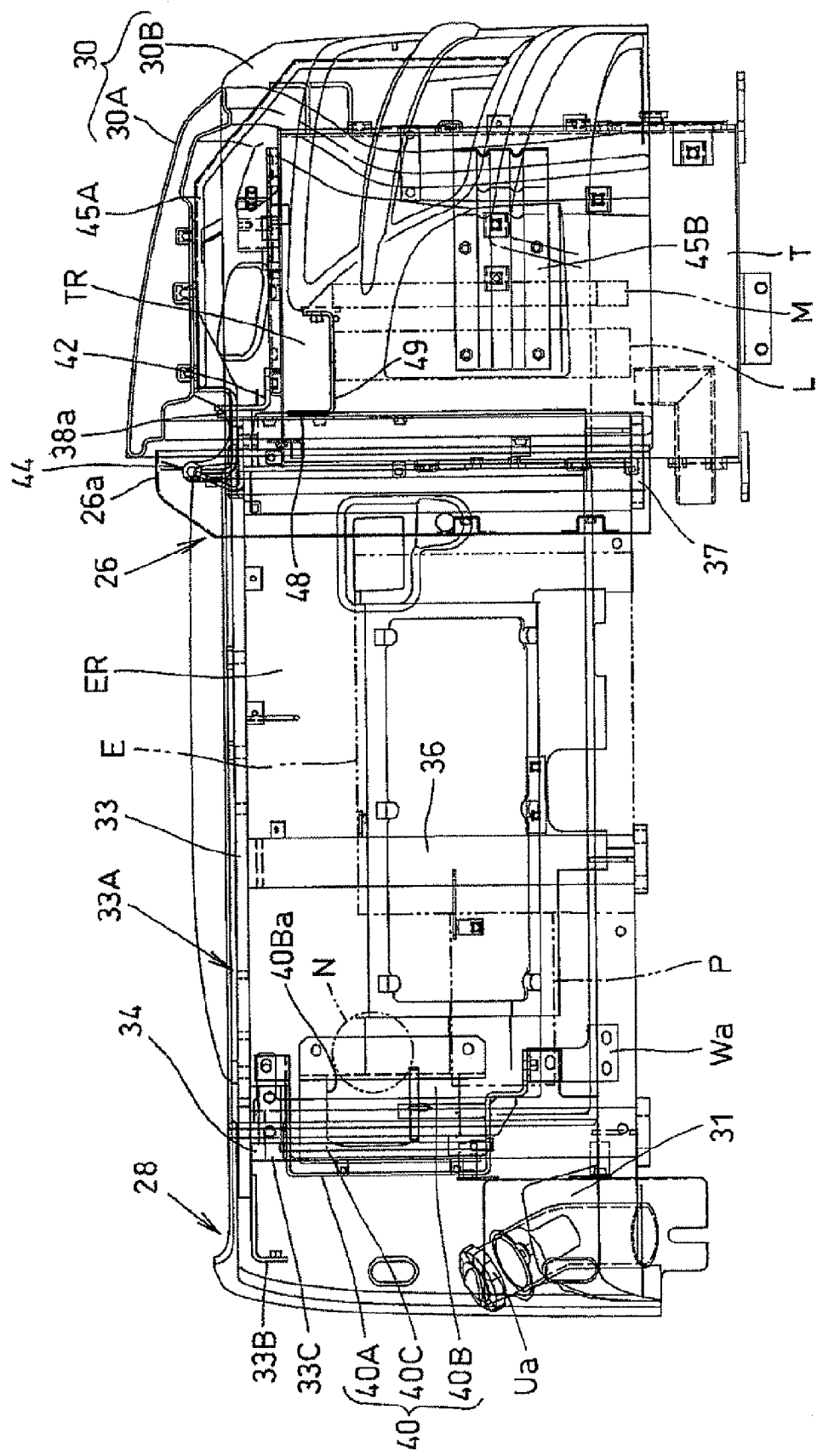
FIG. 4 is a rear side view of the upper assembly structure.
Figure 5:
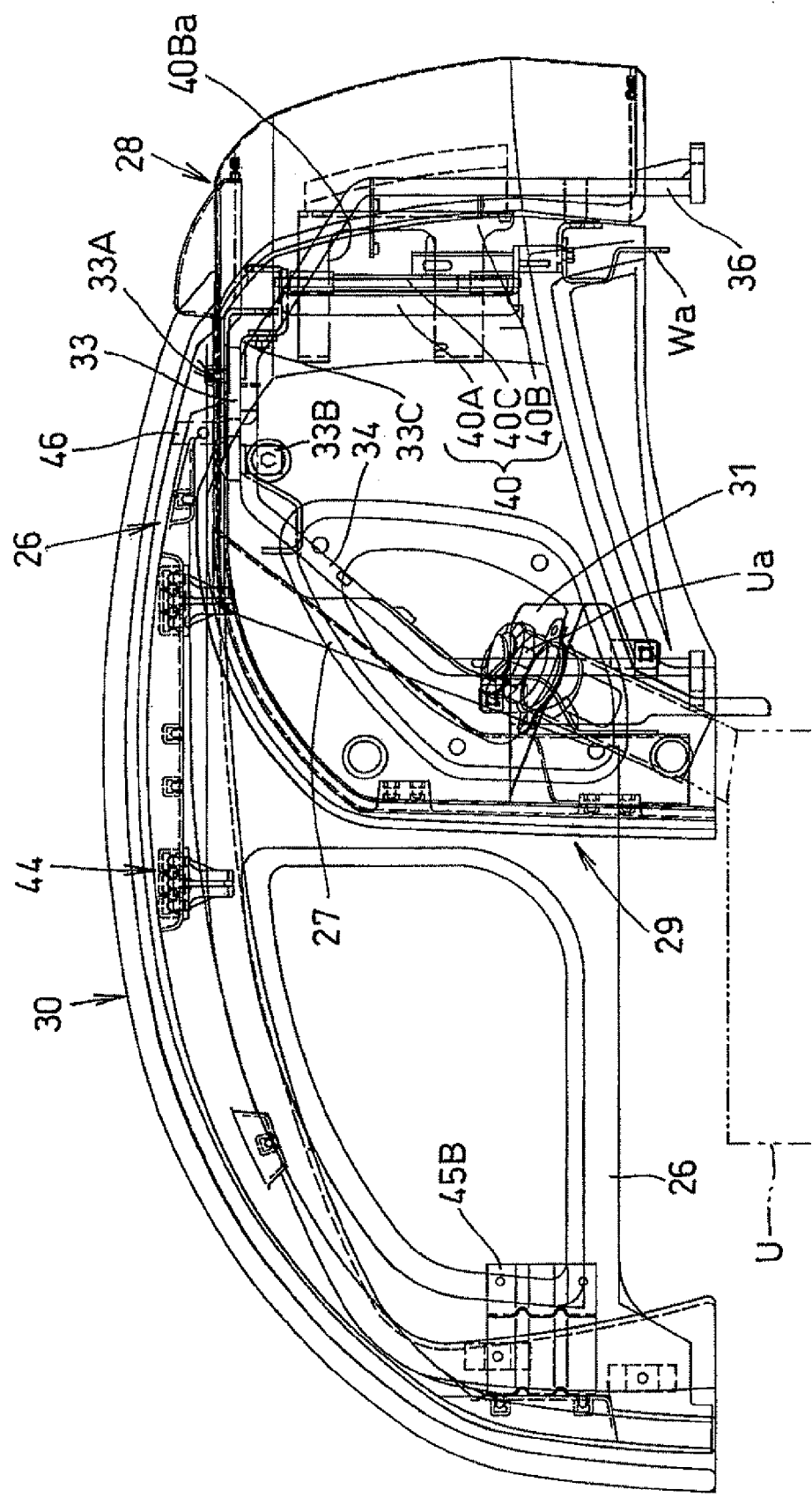
FIG. 5 is a left side view of the upper assembly structure.
Figure 6:
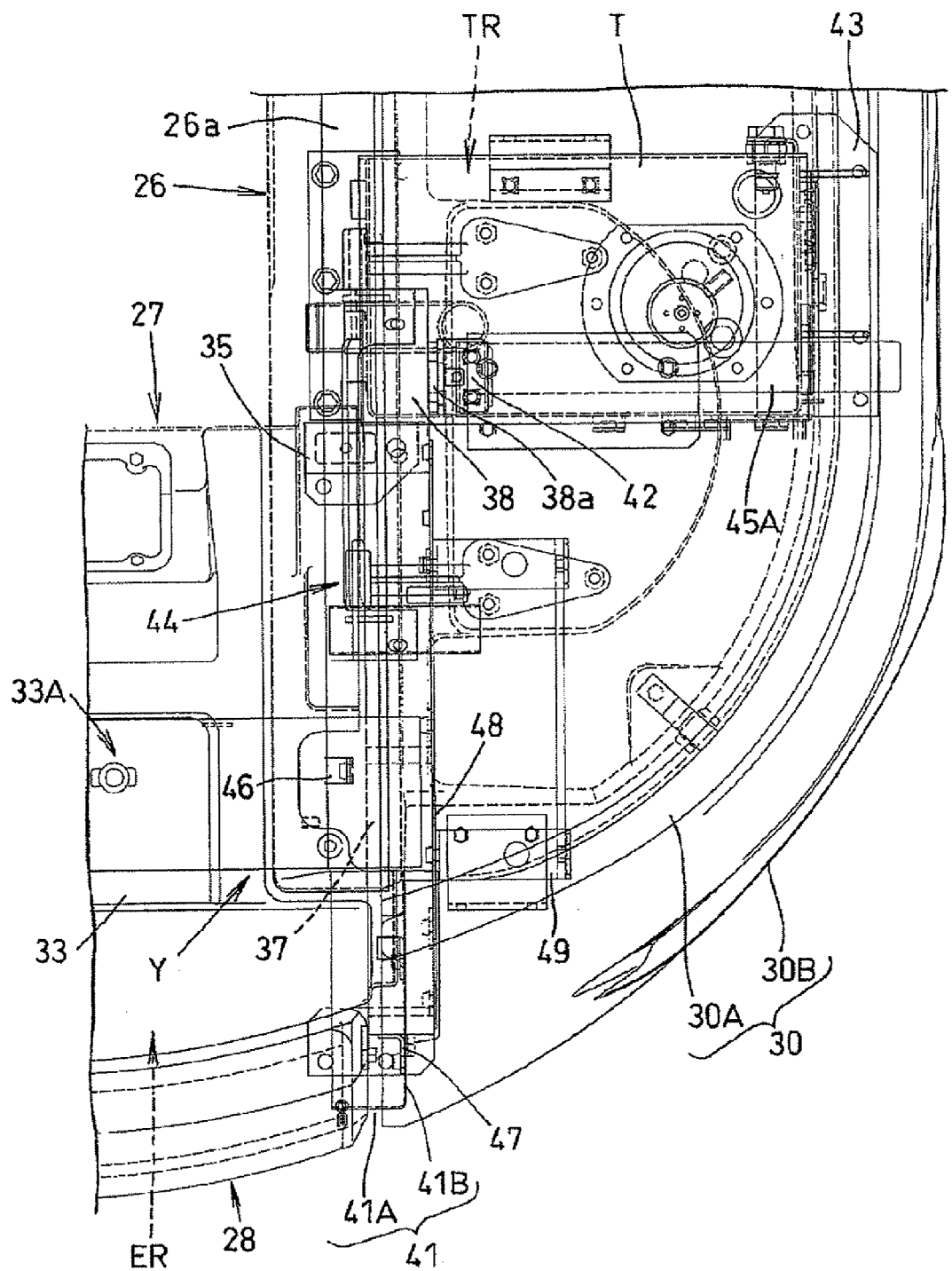
FIG. 6 is an enlarged top plan view of a right rear portion of the upper assembly structure.
Figure 7:
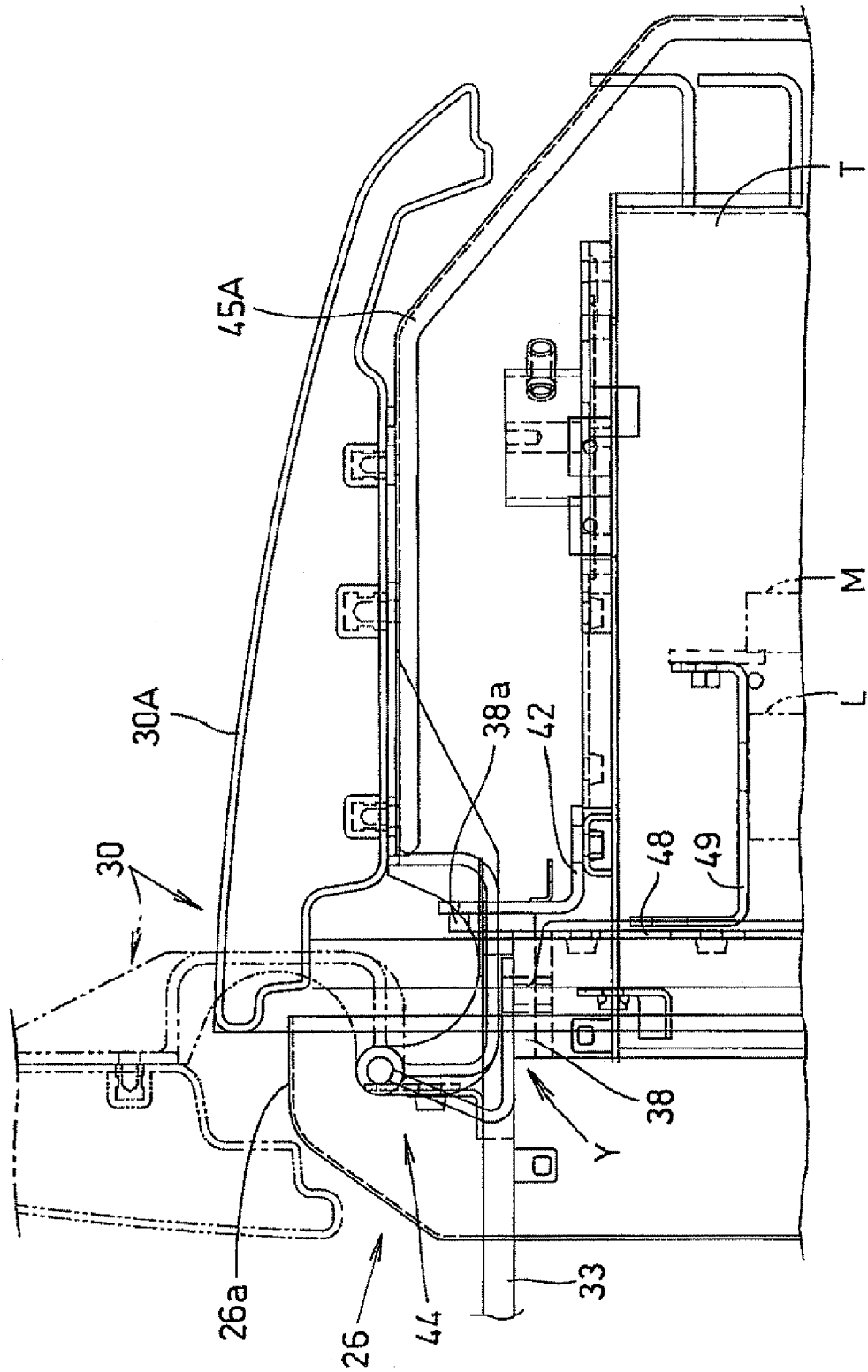
FIG. 7 is an enlarged rear side view of the right rear portion of the upper assembly structure in vertical section.
Figure 8:
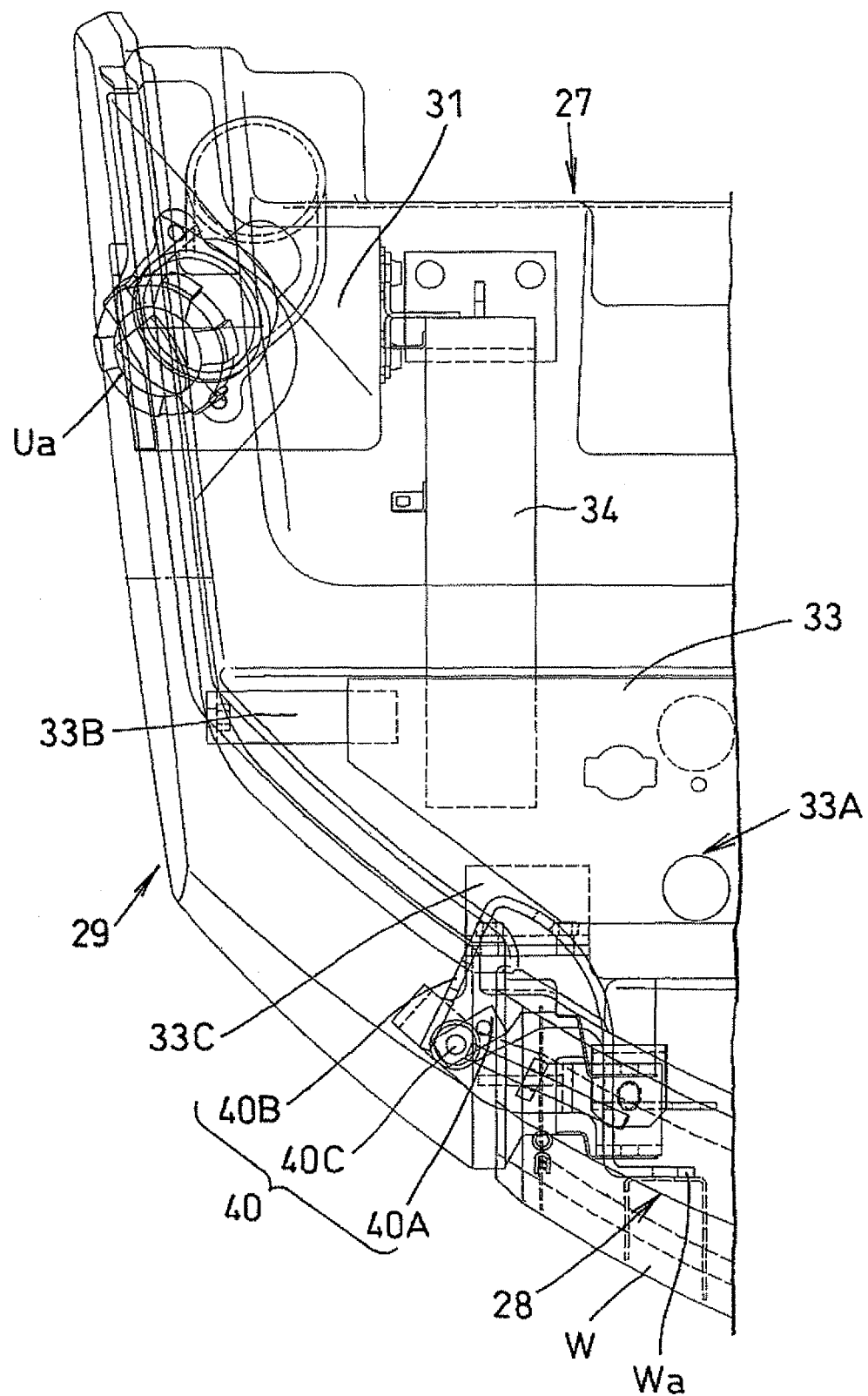
FIG. 8 is an enlarged top plan view of a left rear portion of the upper assembly structure.

Reference sign U shown in FIGS. 2 and 5 denotes a fuel tank that may be arranged in the tank compartment TR. Instead, in this embodiment, the fuel tank is mounted on the pedestal 6A under a step surface located at a lower left position of the driver's seat 8. The fuel tank U has a fuel inlet Ua extending through the front-and-rear partition 27 to the left cover member 29.

The tank compartment TR mounted on the right side of the swivel deck 6 accommodating the oil tank T, the control valve Q, the radiator L and the like is partitioned at a left side thereof by the side partition 26 fixed at a position adjacent to the driver's seat 8, and is covered by a tank cover member 30 at an upper side, a front side, and a right side thereof Both the engine compartment ER and the tank compartment TR are arranged to form a substantially L-shape as viewed from the top and communicate with each other in the interior The hood 28 and the tank cover member 30 are opened to expose most part of the components mounted on the swivel deck 6 at the side portions thereof, which allows inspection and maintenance.

In FIGS. 1 to 8, a four-column type support frame Y is provided within the engine compartment ER to extend across the engine E. The support frame Y includes a backbone member 33 positioned above the engine E, a pair of right and left front leg members 34 and 35 and a pair of right and left rear leg members 36 and 37 extending downward from the backbone member 33 at front and rear portions thereof to be fixed to the swivel deck 6, and an arm member 38 extending forward from an end portion of the backbone member 33 adjacent to the tank T.

The backbone member 33 is formed of a rectangular flat plate, and covered by an upper rear portion of the front-and-rear partition 27, and provided with an attaching portion 33A formed therein to receive a rear portion of the cabin 20 (or a rear post or posts of the two-column type ROPS or the four-column type canopy).

At a left end portion of the backbone member 33 are mounted a stay 3313 for detachably fixing an upper portion of the left cover member 29, and a stay 33C for receiving an upper portion of a pivotal support member 40 for pivotably supporting the hood 28.

The pivotal support member 40 has a fixed piece 40A connected to a swing piece 403 through a vertical shaft 40C to be pivotable about a vertical axis. The fixed piece 40A is fixed to the stay 33C of the backbone member 33 at an upper portion thereof and fixedly connected to the counter weight W (or the pedestal 6A) at a lower portion thereof through a stay Wa.

The swing piece 40B is connected at a free end thereof to a left side end of the hood 28. The swing piece 40B has a U-shape as viewed from the top so as to allow the hood 28 to be opened outwardly of the left cover member 29. An opening 40Ba is formed in a vertical intermediate portion of the swing piece 40B so as to avoid collision with the air cleaner N supported to the left end of the backbone member 33 or the left front leg member 34, that is to say, so as to allow the swing piece 40B to be pivoted to a position to overlap the air cleaner N when the hood 28 is closed.

In the support frame Y, each of the left front leg member 34, the left rear leg member 36, and the right rear leg member 37 is formed of a bent band plate. The arm member 38 is formed of a band plate. The right front leg member 35 is formed of a square bar (or band plate). Those leg and arm members are welded to the backbone member 33, separately. Due to the separate welding of each member to the backbone member 33, those members are free from a mutual influence of a strain caused by the welding, which ensures dimension accuracy of the support frame Y.

The left front leg member 34 is secured to a left end of the backbone member 33 at an upper portion thereof and fixed to a left front stay 6a secured to the intermediate wall 6C at a lower portion thereof. An opening cover 31 is attached to the left front leg member 34. The opening cover 31 is adapted to close the opening formed in the front-and-rear partition 27 through which the fuel inlet Ua of the fuel tank U extends in order to prevent hot air from flowing into the driver's seat 8 from the engine compartment ER. The opening cover 31 is arranged at a rear side of the front-and-rear partition 27.

The left rear leg member 36 is secured to a lateral intermediate portion of the backbone member 33 at an upper portion thereof, and fixed to a left rear stay 6b mounted upright on the pedestal 6A at a lower portion thereof.

The right front leg member 35 is secured to a fore-and-aft intermediate portion of the arm member 38 at an upper portion thereof; and fixed to a right front stay 6c secured to the intermediate wall 6C at a lower portion thereof. The right rear leg member 37 is secured to a right end of the backbone member 33 at an upper portion thereof and fixed to a right rear stay 6d mounted upright on the pedestal 6A at a lower portion thereof.

The arm member 38 is secured to the right end of the backbone member 33 at a rear end thereof A front end of the arm member 38 terminates as a free end around the oil tank T beyond the right front leg member 35. An attachment member 38a is mounted on the free end of the arm member 38 to receive an upper portion of the oil tank T through an L-shaped tank bracket 42.

The oil tank T is fixed in place to a tank seat 43 fixed to the pedestal 6A of the swivel deck 6 at a lower portion thereof. Since the oil tank T is fixed to the tank seat 43 at the lower portion thereof while being fixed to the support frame Y at an upper portion thereof through the tank bracket 42, the attachment strength is enhanced. Thus, even if an impact is applied to the swivel deck 6, vibrations can be minimized, and the number of the attachment bolts needed to attach the tank to the tank seat 43 can be reduced.

A hinge 44 having a fore-and-aft axis is provided on a top surface of the arm member 38 in a portion hidden by a flange 26a of the side partition 26. The tank cover 30 is attached to the hinge 44.

The tank cover 30 may be a one-piece member, but includes two members, that is, an upper member 30A and a side member 30B in the present embodiment. The upper member 30A is made of a resin material and fixed to the hinge 44. The side member 30B is made of sheet metal and connected to the upper member 30A through a plurality of connecting elements 45A and 45B, for example, including front, rear, and intermediate connecting elements.

The side partition 26 is connected to the swivel deck 6 through a stay at a lower portion thereof, connected to a right part of the support frame Y, that is, the right end of the backbone member 33, and the arm member 38, for example, at a rear upper portion thereof through a stay 47.

A cover receiving member 41 is attached to; the rear side of the right rear leg member 37 in a rearward extension of the side partition 26 through the stay 47. The cover receiving member 41 is made of sheet metal and has a stepwise shape in section. The cover receiving member 41 includes a receiving rear surface 41A contacting a free end (right end) of the hood 28 when closed, and a receiving side surface 41B contacting a rear edge of the tank cover member 30 adjacent to the pivotal support portion thereof when closed, which allows a joint portion between the hood 28 and the tank cover member 30 to be sealed to prevent hot air and noise from leaking to the outside from the engine compartment A shutter plate 48 is fixed between the right front leg member 35 and the right rear leg members 37 under the backbone member 33 and the arm member 38. A pair of front and rear retainer 49 are fixed to the shutter plate 48, through which the radiator L and the oil cooler M is fixed at upper portions thereof The radiator L is fixed to the swivel deck 6 at a lower portion thereof and includes a fan shroud arranged adjacent to the engine E. The shutter plate 48 and other shutter members are adapted to close between the fan shroud and the backbone member 33, the arm member 38, and the right front and rear leg members 35 and 37, thereby separating those members to prevent air flowing from the radiator L toward the engine E from flowing backward from the engine E toward the radiator L as hot air. The cover receiving member 41 also acts as such a partition.

The support frame Y supports directly or indirectly the external parts including the side partition 26, the front-and-rear partition 27, the hood 28, the left cover member 29, the tank cover member 30, the opening cover 31 and the cover receiving member 41, the shutter plate 48, and the cabin 20 (or a ROPS or a canopy), and the internal equipment including the air cleaner N, the oil tank T, the radiator L, and the oil cooler M. In particular, the support frame Y has the arm member 38 protruding toward the tank compartment TR, which allows the oil tank T and the tank cover member 30 to be supported thereto. Since those members are supported concentratedly by the support frame Y, the mounting positions of those members relative to the swivel deck 6 and relative to one another can be maintained constant. This facilitates dimension control for the gaps and the degree of overlapping between the components to enhance the assembling accuracy.

FIGS. 1 to 11 show the best mode of the shapes of the components and the positional relationships between the components with respect to the fore-and-aft direction, the transverse direction, and the vertical direction in accordance with the present invention. However, it should be noted that the present invention is not limited to the embodiment noted above, but the components, their arrangements, and their combinations can be variously modified.

For example, the backhoe 1 includes the tank compartment TR for the oil tank T and the like arranged at the right side of the swivel deck 6. Instead, the tank compartment may be arranged at the left side of the swivel deck 6 so that the positions of the oil tank T and the driver's seat 8, or the positions of right and left control devices 22 and 23 may be reversed.

The support frame Y may include the left rear leg member 36 and the left front leg member 34 that are formed by bending a single band plate. The four-column construction may be a three-column construction omitting the left rear leg member 36.

Further, the left rear leg member 36 may be connected to the left end of the backbone member 33, while the pivotal support member 40 for pivotably supporting the hood 28 may be fixed to the backbone member 33 and the left rear leg member 36.

What is claimed is:

1. An upper assembly structure of a work machine comprising:
    a driver's seat mounted on a vehicle body;
    an engine compartment for housing an engine;
    a tank compartment for housing a tank;
    a hood;
    a tank cover member;
    a first partition for partitioning between the engine compartment and the driver's seat;
    a second partition for partitioning between the tank compartment and the driver's seat; and
    a support frame mounted on the engine compartment including an arm member protruding from the support frame toward the tank compartment;
    wherein the engine compartment and the tank compartment are arranged to form an L-shape as viewed from the top, wherein the engine compartment is covered by the first partition and the hood, wherein the tank compartment is covered by the second partition and the tank cover member, and
    wherein the arm member supports internal equipment arranged inside the tank compartment and a hinge having a fore-and-aft axis is provided on a top surface of the arm member, the tank cover being attached to the hinge.

2. An upper assembly structure of a work machine comprising:
    a driver's seat mounted on a vehicle body;
    an engine compartment provided in a rear portion of the vehicle body for housing an engine;
    a tank compartment provided in one lateral side of the vehicle body for housing a oil tank;
    a first partition for partitioning the assembly at a front side of the engine compartment;
    a hood for covering a rear portion of the engine compartment to be opened and closed;
    a side partition for covering a side of the tank compartment adjacent to the driver's seat;
    a tank cover member for covering an outward portion of the tank compartment to be opened and closed;
    a second partition for partitioning between the tank compartment and the driver's seat; and
    a support frame mounted on the engine compartment including:
        a backbone member positioned above the engine;
        a left front leg member;
        a right front leg member;
        a rear leg member, the left front leg member, the right front leg member, and the rear leg member being extending downward forwardly and rearwardly of the backbone member; and
        an arm member extending forward from an end of the backbone member adjacent to the tank compartment,
    wherein the support frame is adapted to support the first partition, the hood, and the second partition at a rear portion thereof, and wherein the arm member is adapted to support the tank cover member and the oil tank.

3. The upper assembly structure as claimed in claim 2, wherein the oil tank is arranged at the right side of the vehicle body, the arm member of the support frame extends forward from a right end of the backbone member, and wherein the front leg member is connected to a fore-and-aft intermediate portion of the aim member at an upper portion thereof.

4. The upper assembly structure as claimed in claim 2, wherein a pivotal support member is attached to a left end of the backbone member at an upper portion thereof for supporting a left end of the hood to be pivotable about a vertical axis, and wherein a cover receiving member is attached to the rear leg member for closing a right end of the hood as closed and a rear edge of the tank cover member.

5. The upper assembly structure as claimed in claim 3, wherein a pivotal support member is attached to a left end of the backbone member at an upper portion thereof for supporting a left end of the hood to be pivotable about a vertical axis, and wherein a cover receiving member is attached to the right rear leg member for closing a right end of the hood as closed and a rear edge of the tank cover member.

* * * * *

UNITED STATES PATENT AND TRADEMARK OFFICE
CERTIFICATE OF CORRECTION

PATENT NO.         : 8,083,019 B2
APPLICATION NO.    : 12/398414
DATED              : December 27, 2011
INVENTOR(S)        : Yuji Fujita et al.

It is certified that error appears in the above-identified patent and that said Letters Patent is hereby corrected as shown below:

Column 8, Line 48, Claim 3, delete "aim" and insert -- arm --

Signed and Sealed this
Thirteenth Day of March, 2012

David J. Kappos
*Director of the United States Patent and Trademark Office*